Oct. 23, 1951     C. C. POWELL ET AL     2,572,757
MECHANISM FOR DISPENSING MEASURED LENGTHS OF TACKY TAPE
Filed Jan. 18, 1949     2 SHEETS—SHEET 1
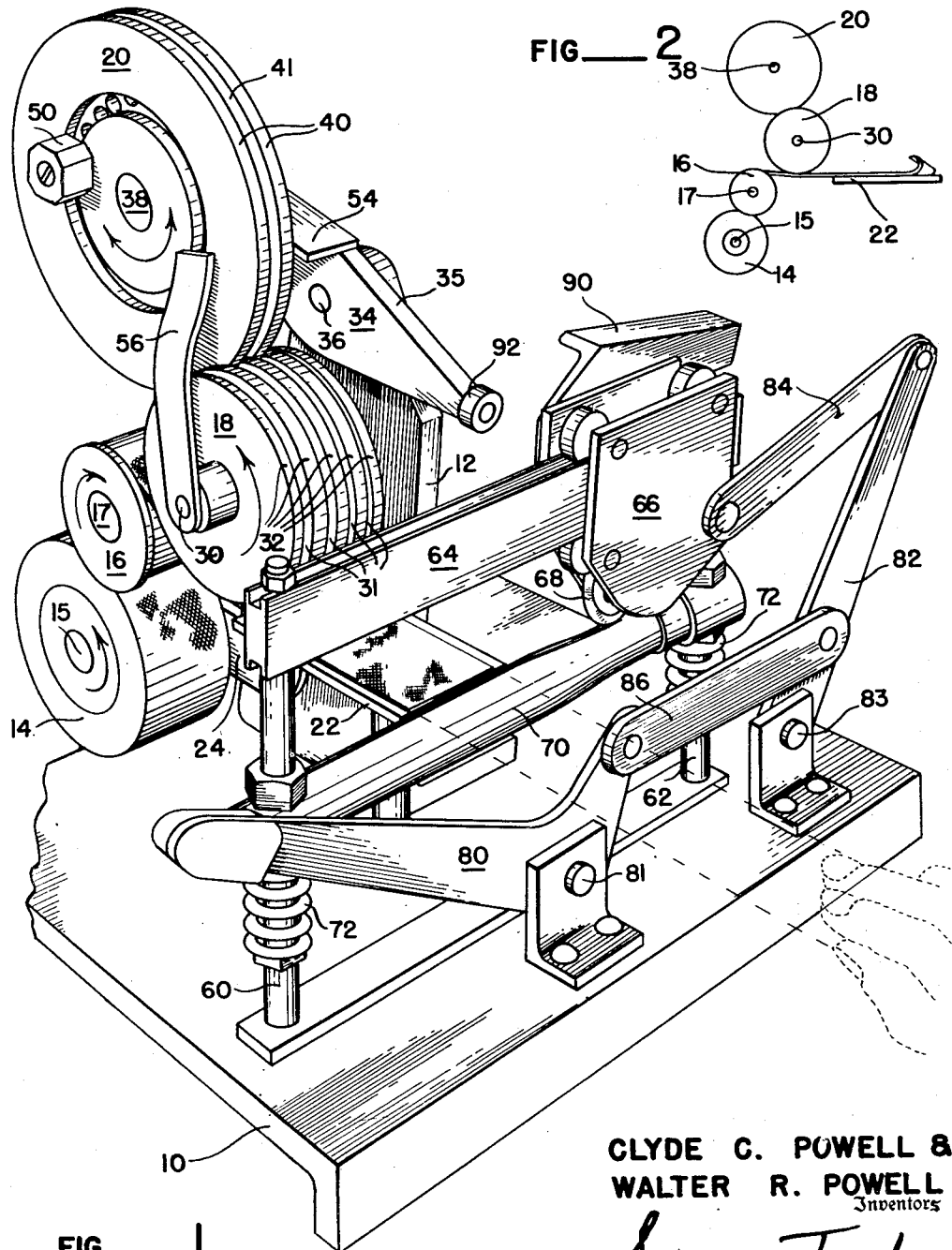
CLYDE C. POWELL &
WALTER R. POWELL
Inventors
Attorneys Oct. 23, 1951 C. C. POWELL ET AL 2,572,757
MECHANISM FOR DISPENSING MEASURED LENGTHS OF TACKY TAPE
Filed Jan. 18, 1949 2 SHEETS—SHEET 2

CLYDE C. POWELL &
WALTER R. POWELL
Inventors

Smith & Tuck
Attorneys

Patented Oct. 23, 1951

2,572,757

UNITED STATES PATENT OFFICE 2,572,757

MECHANISM FOR DISPENSING MEASURED LENGTHS OF TACKY TAPE

Clyde C. Powell and Walter R. Powell, Seattle, Wash.

Application January 18, 1949, Serial No. 71,464

2 Claims. (Cl. 164—77)

This invention relates to improvements in a mechanism for dispensing measured lengths of tacky tape of the pressure-sensitive type and normally adhesive without solvents or heat.

While dispensing devices for tacky tape are known in the art, the previous devices have defects that this invention is designed to overcome. A main difficulty of previous devices has been to attain the dispensing of accurately measured lengths of tacky tape and a main criticism of devices that automatically measure a predetermined length of tape is that the measuring device, which is usually a roller, has direct contact with the tacky side of the tape, so that, when the length has been dispensed and the measuring device is to be returned to the normal position, re-setting of the measuring means to the starting position is difficult to attain and normally has only been had with complicated means that are difficult to arrange and can get out of order very easily.

Among the important objects of this invention are to provide for dispensing tacky tape, a mechanism: by which a predetermined measured length of tape can be accurately and cleanly dispensed; in which the tacky nature of the tape is employed to cooperatively operate a measuring element during withdrawal of the tape from a suitable source; in which a reciprocal measuring element is employed and moved in one direction during tape withdrawal and is disengageable to return to a normal position to prepare the mechanism for a subsequent withdrawal operation; in which there is a reciprocal cut-off mechanism that is easily operated following withdrawal of a measured length of tape; in which the disengagement and return of the measuring element to normal is cooperatively related to a cut-off mechanism; in which tape being dispensed is presented with the cut-off end having the tacky side uppermost for convenient grasping for manual withdrawal of measured lengths; in which there is a measuring roller that is out of contact with the tacky side of the tape during withdrawal and yet operates to limit withdrawal of the tape but can also simply be permitted to return to a normal position for a second withdrawal operation; in which the permissible turning of a measuring roller can be easily and quickly varied to meet varying needs as to tape length; in which the measuring of a predetermined length of tape is automatic and takes place simultaneously with the withdrawal of a length of tape; and in which the mechanism is simple in construction and operation and can be used by unskilled personnel to dispense varying lengths of tacky tape with considerable accuracy.

The foregoing disadvantages are overcome and the objects stated, together with other objects that will be more apparent during the course of the following description, are attained by the mechanism shown in the accompanying drawings, in which:

Figure 1 is a perspective view of our mechanism for dispensing measured lengths of tacky tape;

Figure 2 is a detailed view schematically showing the arrangement of tape holding, feeding, and measuring rollers employed in our mechanism;

Tape feeding mechanism

Figure 3:
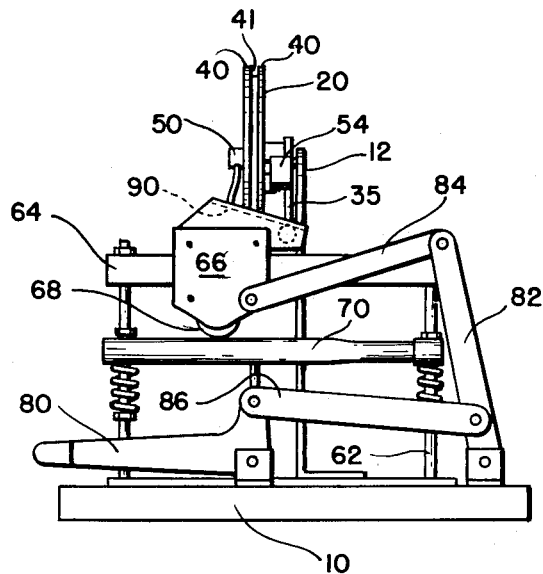
Figure 3 is reduced front view in elevation of the mechanism of Figure 1.

Referring to Figure 1 of the drawings, we show a base 10 of any suitable material, preferably substantial as to weight and strength, upon which is mounted our mechanism. An upright plate of leg 12 supports, in parallel axes, the storage roller 14, the guide roller 16, the idler roller 18, the measuring roller 20, and the delivery table 22, all shown in their relative relationship in Figure 2.

The storage roller 14 is rotatably mounted on axle 15 which is supported by arm 24 that is in turn pivotally connected by pin 26 to leg 12.

Guide roller 16 is rotatably mounted on axle pin 17 that is supported from leg 12 by bracket 28. Roller 16 overlies roller 14, slightly to one side thereof.

Figure 5:
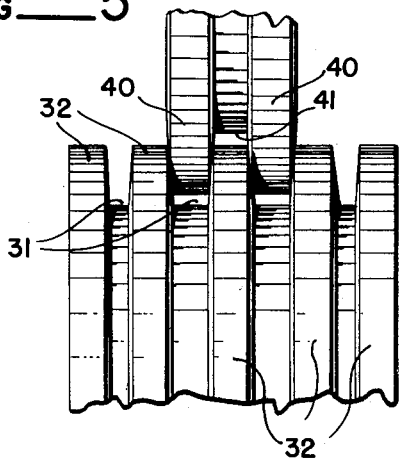
Figure 5 is an enlarged fragmentary view showing the manner in which the peripheries of a feeding idler roller and the measuring roller interengage in our mechanism.

The idler roller 18 which is journalled on pin 30 that is fixedly mounted in plate 12, has its periphery annularly grooved as at 31, as shown in Figure 5 to provide spaced apart ridges 32.

A medially pivoted lever 34 is mounted on pivot pin 36 that is supported by leg 12. The measuring roller 20 rotates on axle 38, that is located near one end of lever 34. Roller 20 has annular tongues or ridges 40 and groove 41 around its outer periphery. The tongues 40 fit into the grooves 31 of roller 18 to obtain a substantial frictional contact between the surfaces of the two rollers when they are closed together. By means of spring 42, anchored at its ends to arms 24 and 34, the rollers 14 and 20 are urged toward each other so that roller 14 tends to press against roller 16. Similarly, roller 20 tends to press against roller 18. An auxiliary spring 44 between arm 34 and bracket 28 imparts a downward pull on arm 34 and supplements spring 42 in this respect to bias arm 34, so that its front end 35 is urged upward.

The tacky tape to be dispensed, carried by roller 14 on which it is spirally wound with the tacky side inward, is passed around guide roller 16 with the non-tacky side contacting said roller. As the tape leaves roller 16, its path changes slightly as the tacky side of the tape contacts the outer face of idler roller 18. The reduction of the cylindrical surface area of roller 18, produced by the grooves 31, decreases the area contact between the tape and the roller, so that the tape may easily be manually drawn past roller 18.

The delivery table 22 is supported by leg 12 in a horizontal plane that is about the same as the bottom of roller 18 and slightly below the top of roller 16. The tacky tape lies on table 22 with the tacky side up, convenient for an operator to grasp the same with the forefingers and to withdraw a length.

*Measuring mechanism*

Figure 6:
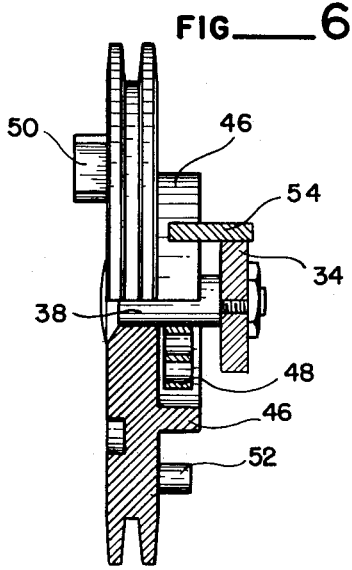
Figure 6 is an enlarged sectional view taken on line 6—6 of Figure 4.

Measuring roller 20, as may be seen in Figure 6, is rotatably mounted on pin 38, which is non-rotatably mounted in arm 34. In a cup 46 is located a spiral spring 48 that has its inner end secured to pin 38 and its outer end secured to cup 46. As roller 20 rotates, relative to pin 38, energy is stored in spring 48. The measuring roller carries, on its side faces, stop members 50 and 52, either or both of which may be variably positioned about the rim of roller 20 in accordance with the desired length of tape that is to be dispensed.

On arm 34 we provide an overhanging flange 54, located in the path of stop 52, to form an abutment when the roller 20 rotates backward under the urgence of spring 48, as will later be described. A stop arm 56 supported on pin 30 forms an abutment in the path of stop boss 50, to limit forward rotation of roller 20 when a length of tape is being withdrawn from the machine; it being apparent that, when rollers 18 and 20 are frictionally interengaged and the tape is pulled, both turn. Roller 18 revolves counterclockwise in Figure 1, while roller 20 revolves clockwise in the same view. The direction arrows of Figure 1 indicate the direction of rotation during dispensing but it will be understood that roller 20, on occasion, rotates counterclockwise when spring 48 is acting upon it, to return stop 52 into contact with the underside of flange 54, which is the normal position.

The stop boss 50 may be moved to various positions on wheel 20 to vary the amount of permissible turning before the boss 50 comes into abutment with arm 56. If a short tape length is desired, roller 20 is permitted to rotate only a small amount, whereas, when a longer tape is desired, the stop 50 is moved to permit a greater rotation of roller 20. Arm 56 can also be manually swung out of the path of stop boss 50 when it is desired to dispense a tape of a length equal to the circumference of roller 20.

*Shearing mechanism*

On the forward portion of the base 10 in front of the dispensing mechanism, is located a shearing means that comprises standards 60, 62 mounted upright and which are joined above by the cross rail 64. A reciprocal carriage 66 travels across and back on rail 64 and carries in a lower position the circular knife 68. A mandrel 70 is slidably mounted at its ends on standards 60, 62 and is urged upward by springs 72. When the carriage is reciprocally moved, the knife 68 rolls on mandrel 70 and cuts the tape where it contacts the mandrel. The forward edge of table 22 is closely located alongside the path of knife 68.

Reciprocation of the shearing knife and its carriage is obtained manually, in this instance, by the use of a bell-crank 80 that is pivotally mounted at the elbow on crank pin 81. A simple lever 82 is mounted on its lower end on base 10, to swing on pivot pin 83, and its upper end is connected to carriage 66 by means of link 84. Connecting link 86 joins one arm of the bell-crank 80 with lever 82 at an intermediate point.

As the free arm of bell-crank 80 is manually depressed from the position of Figure 1 to that of Figure 3, the carriage 66 is caused to move across the path of a tape length that has been drawn off roller 18 and to shear the same. The free end of bell-crank 80 is lifted to return the carriage to the normal position, thus reciprocating the rotary knife 68.

*Measuring roller release*

During a withdrawal of tape and a turning of roller 20 in a clockwise direction indicated in Figure 1, the stop 50 revolves into abutment with arm 56, where it will remain as long as wheels 18 and 20 are pressed together. Such is due to the substantial frictional contact that is obtained between the rollers, primarily due to the action of the springs 40 and 44 and the interfitting of the tongues and grooves that are formed around the outer faces of the rollers. Under such circumstances, the spring 48 at the hub of the roller 20 is tensioned or wound up.

Figure 4:
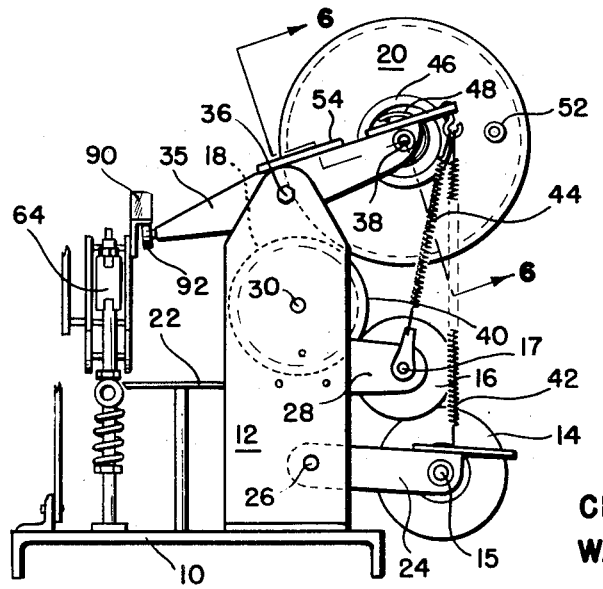
Figure 4 is a similarly reduced side view in elevation of our dispensing machine.

Pressure applied to the forward end 35 of arm 34 will cause roller 20 to swing away from roller 18 and for this purpose we employ the inclined flange that is secured to and travels with the carriage 66. The under inclined face of flange 90 contacts the anti-friction roller 92 of the front end 35 of arm 34 and causes the same to be depressed as in Figures 3 and 4. This action lifts roller 20 out of contact with roller 18, and the spring 48 unwinds to backwardly rotate roller 20 until stop boss 52 contacts the underside of flange 54, whereupon the roller 20 has been returned to its normal position.

When the carriage is returned back along rail 64, the arm 34 is allowed to rock up on its forward end, permitting roller 20 to again interengage with roller 18. In this way the measuring mechanism is re-set for a subsequent dispensing operation.

*Method of operation*

It will have already been seen that the operation of the mechanism is quite simple. Briefly, the operation is conducted as follows: An operator picks up the free end of a piece of tape, that is led from roll 14 to table 22, by pressing lightly with the forefingers on the upper tacky side, and imparts a pulling action. The tacky side of the tape presses against the lower grooved face of roller 18, due to its passing over roller 16, the upper surface of which is slightly higher than the bottom of roller 18. As the tape is withdrawn, roller 18 turns on its axis and causes roller 20 to likewise turn and store energy in spring 48. At the same time, stop 50 revolves until it comes into abutment with arm 56, whereupon further withdrawal is prevented. Under such circumstances, the tape will be in the dotted line position of Figure 1, intersecting the path of knife 68 and overlying the mandrel 70. Assuming that the operator has used the right hand to grasp and pull on the tape, he then presses with his left hand on bell-crank 80 and causes the knife to cut across the tape and sever the same. In the manner that has been described, the measuring roller 20 is at this time returned to the normal position. When the severed piece of tape is disposed of, a repeated operation is capable of performance and all subsequent withdrawals on one setting of stop 50 will produce dispensed tape lengths that are identical. This latter follows irrespective of the decreasing circumference of roller 14 as tape is drawn off.

It will be obvious to those skilled in the art, that the form and arrangement of parts shown herein may be varied without departing from the spirit and scope of the invention. Such changes can include empowering the shearing means and the tape feeding means to eliminate manual power that is employed in this machine.

Having thus described our invention, we claim:

1. In a dispenser for tacky tape spooled in a roll with the tacky side inward, an idler roller mounted to turn about a fixed axis in contact with the tacky surface of a tape moving thereby, means for holding a supply of tacky tape and for delivering the same with the tacky side in contact with said idler roller to cause the latter to revolve when the tape is withdrawn from the dispenser upon direct manual pull on the outer end of the tape, a measuring roller mounted to turn from a normal position with its periphery in normal frictional contact with said idler roller and out of contact with said tacky tape, a lever for supporting said measuring roller, said lever being pivoted about an axis offset from but parallel to the axis of said measuring roller and having an arm thereon extending outwardly to that side opposite said measuring roller, means for urging said measuring roller into contact with said idler roller, means for limiting forward rotation of said measuring roller, means for biasing said measuring roller for backward rotation to the normal position, means for limiting backward rotation of said measuring roller past its normal position, a reciprocal shearing means operable across the path of said tape to cut the same, means for reciprocally moving said shearing means, means carried by said shearing forming an inclined surface, said inclined surface being located to contact said outwardly extending arm during reciprocation and to move the same to cause the measuring roller to swing out of contact with said idler roller.

2. In a dispenser for tacky tape spooled in a roll with the tacky side inward, swingably mounted means for holding a roll of tacky tape, a guide roller closely overlying said roll of tape to receive the same therefrom with the non-tacky side passing over the guide roller surface, means for pressing said guide roller and tape roll together at all times, an idler roller in spaced apart relation forward of said guide roller to receive tape therefrom so that the tape passes between said guide and idler rollers and the tacky surface contacts the idler roller on a minor under portion of its surface, means for receiving the non-tacky surface of said tape and for supporting the same as it leaves said idler roller, a medially pivoted arm above to one side of said idler roller, a measuring roller carried by said pivoted arm on one side of its pivot and in normal frictional contact with said idler roller and out of contact with said tape, means for urging said measuring and idler rollers into frictional contact with each other, means for limiting forward rotation of said measuring roller, means for biasing said measuring roller for backward rotation to the normal position, means for limiting backward rotation of said measuring roller past its normal position, a roller shear reciprocally operable across the path of tape on said receiving and supporting means, means for reciprocally moving said roller shear, means carried by said shear including an inclined surface, said medially pivoted arm extending on that side of its pivot opposite the location of the measuring roller to the path of the inclined surface carried by said shear whereby the latter depresses said arm and raises said measuring roller out of contact with the idler roller as the tape is being severed whereupon the measuring roller is permitted to return to its normal position.

CLYDE C. POWELL.
WALTER R. POWELL.

REFERENCES CITED

The following references are of record in the file of this patent:

UNITED STATES PATENTS

| Number | Name | Date |
|---|---|---|
| 676,973 | Baker | June 25, 1901 |
| 794,060 | Uzel | July 4, 1905 |
| 1,699,235 | Geiss | Jan. 15, 1929 |
| 1,732,635 | Chabot | Oct. 22, 1929 |
| 1,732,636 | Gautier et al. | Oct. 22, 1929 |
| 1,972,851 | McCarthy | Sept. 4, 1934 |
| 2,147,776 | Mitchell | Feb. 21, 1939 |
| 2,233,361 | Anderson et al. | Feb. 25, 1941 |
| 2,291,668 | Weigolt | Aug. 4, 1942 |
| 2,366,971 | Krueger | Jan. 9, 1945 |
| 2,424,488 | Morin | July 22, 1947 |